United States Patent
Kleen et al.

(10) Patent No.: US 9,956,875 B2
(45) Date of Patent: May 1, 2018

(54) METHOD AND DEVICE FOR A VEHICLE CONFIGURED FOR AUTOMATIC LONGITUDINAL GUIDANCE

(71) Applicant: VOLKSWAGEN AG, Wolfsburg (DE)

(72) Inventors: Andro Kleen, Braunschweig (DE); Helge Schaefer, Braunschweig (DE); Daniel Ricknäs, Stockholm (SE); Johannes Rhede, Berlin (DE); Marc-Michael Meinecke, Sassenburg (DE)

(73) Assignee: Volkswagen AG (DE)

(*) Notice: Subject to any disclaimer, the term of this patent is extended or adjusted under 35 U.S.C. 154(b) by 0 days. days.

(21) Appl. No.: 15/026,615

(22) PCT Filed: Sep. 30, 2014

(86) PCT No.: PCT/EP2014/070929
§ 371 (c)(1),
(2) Date: Apr. 1, 2016

(87) PCT Pub. No.: WO2015/049234
PCT Pub. Date: Apr. 9, 2015

(65) Prior Publication Data
US 2016/0229292 A1 Aug. 11, 2016

(30) Foreign Application Priority Data
Oct. 1, 2013 (EP) .................................... 13186817

(51) Int. Cl.
*B60W 50/14* (2012.01)
*B60K 35/00* (2006.01)
(Continued)

(52) U.S. Cl.
CPC .......... *B60K 31/0008* (2013.01); *B60K 35/00* (2013.01); *B60W 30/17* (2013.01);
(Continued)

(58) Field of Classification Search
CPC ... B60K 31/0008; B60K 35/00; B60W 50/14; B60W 30/17
See application file for complete search history.

(56) References Cited

U.S. PATENT DOCUMENTS

2005/0065687 A1* 3/2005 Hijikata ................ G01S 17/936
701/41
2010/0253493 A1* 10/2010 Szczerba ............... G01S 13/723
340/435

FOREIGN PATENT DOCUMENTS

DE         19539799 A1    5/1996
DE    102005022676 A1   11/2006
(Continued)

OTHER PUBLICATIONS

Search Report for International Patent Application No. PCT/EP2014/070929; dated Dec. 23, 2014.

*Primary Examiner* — Jerrah Edwards
*Assistant Examiner* — Kelly D Williams
(74) *Attorney, Agent, or Firm* — Barnes & Thornburg LLP

(57) ABSTRACT

A method and a device for a vehicle configured for automatic longitudinal guidance. The method involves detecting a guide vehicle, the guide vehicle being a vehicle travelling directly in front of the vehicle; determining a current state from at least two states which describe a current reaction of the vehicle to the guide vehicle; and displaying the current state in animated form on a display.

7 Claims, 2 Drawing Sheets

(51) Int. Cl.
*B60W 30/17* (2012.01)
*B60K 31/00* (2006.01)

(52) U.S. Cl.
CPC ..... *B60W 50/14* (2013.01); *B60K 2031/0033* (2013.01); *B60K 2350/1084* (2013.01); *B60W 2050/146* (2013.01); *B60W 2550/308* (2013.01)

(56) References Cited

FOREIGN PATENT DOCUMENTS

| | | |
|---|---|---|
| DE | 102007029482 A1 | 1/2009 |
| DE | 102008061649 A1 | 12/2009 |
| FR | 2927699 A1 | 8/2009 |
| WO | 2011108091 A1 | 9/2011 |

\* cited by examiner

METHOD AND DEVICE FOR A VEHICLE CONFIGURED FOR AUTOMATIC LONGITUDINAL GUIDANCE

PRIORITY CLAIM

This patent application is a U.S. National Phase of International Patent Application No. PCT/EP2014/070929, filed 30 Sep. 2014, which claims priority to European Patent Application No. 13186817.6, filed 1 Oct. 2013, the disclosures of which are incorporated herein by reference in their entirety.

FIELD

Illustrative embodiments relate to a method and a device for a vehicle which is configured for automatic longitudinal guidance and/or for automatic driving.

SUMMARY

Vehicles which are configured for automatic longitudinal control or for automatic driving are already on the market or are at least in planning. In particular, in phases in which such a function automatically controlling a vehicle is introduced newly on the market or when a driver comes into contact with such a function for the first time, it is particularly important to provide the driver with an appropriate understanding and confidence in this function.

Illustrative embodiments provide this appropriate understanding and the confidence in a function by means of which the automatic longitudinal control of a vehicle is effected to a driver in a better way than is the case in accordance with the prior art.

BRIEF DESCRIPTION OF THE FIGURES

The disclosed embodiments are described in detail with respect to the figures.

DETAILED DESCRIPTION OF THE DISCLOSED EMBODIMENTS

Figure 1:
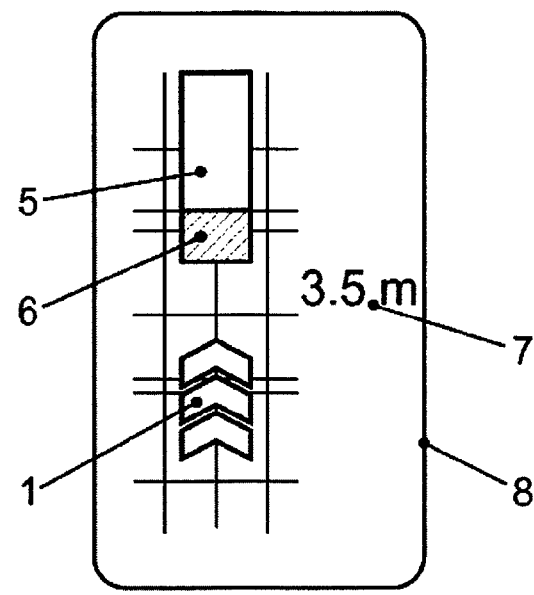
FIG. 1 shows a display in accordance with at least one disclosed embodiment.

Disclosed embodiments provide a vehicle configured for automatic longitudinal control. In this context, the device comprises a sensor, a control and a display. The sensor is configured to detect a guide vehicle. In this context, a guide vehicle is understood to be a vehicle which, in particular, drives along in the same traffic lane as the vehicle directly in front of the vehicle. The device is configured for determining one of a number of states based on results or outputs of the sensor and to display this current state in animated form on the display so that it can be distinguished from the other ones of these states. In this context, the states describe a current response of the vehicle to the guide vehicle.

In this context, longitudinal control is understood to be control of the speed of the vehicle, the longitudinal control also comprising processes such as the starting of the vehicle or the braking of the vehicle (into standstill). A vehicle which drives automatically (i.e., without any manual operation by the driver) is thus mandatorily also configured for automatic longitudinal control so that the disclosed device can also be used in a vehicle which is configured for automatic driving. The sensor of the device can also be a number of sensors of different type (for example, a stereo camera, a radar and an ultrasonic sensor).

In other words, the respective state can be considered as state of a system for automatic longitudinal guidance of the vehicle or as state of a system for automatic driving of the vehicle. Accordingly, this state of the system describes the current response of the system and thus of the vehicle to the guide vehicle.

By one of a number of states which in each case describe the current response of the vehicle to the guide vehicle being displayed in animated form on the display, the driver can rapidly obtain an overview of the current driving situation of his vehicle. This applies, in particular, when the automatic longitudinal guidance or the automatic driving of the vehicle is designed for exclusively following this guide vehicle.

In particular, the states are then selected from a group of states which comprises the following states:

The vehicle follows the guide vehicle with a constant or increasing speed. In this state, the vehicle already drives and does not brake. The automatic longitudinal control is activated.

The vehicle follows the guide vehicle with a decreasing speed. In this state, the vehicle also already drives but its speed drops, for example, due to a braking process, possibly up to standstill. The automatic longitudinal control is activated.

The vehicle will follow the guide vehicle currently standing as soon as the guide vehicle starts to move. In this state, the vehicle is standing, but will start to move automatically as soon as the guide vehicle starts. The automatic longitudinal control is activated.

The vehicle will follow the guide vehicle just starting to move. In this state, the vehicle is also standing but the guide vehicle has started to move so that the vehicle will shortly follow the guide vehicle. The automatic longitudinal control is activated.

According to the disclosed embodiments, the group of states could also comprise the state that the automatic longitudinal control is not activated.

In addition, the device can determine a distance between the guide vehicle and the vehicle with the aid of the sensor and display this distance on the display.

Displaying the distance between the vehicle and guide vehicle enables the driver to perform a simple calibration of the real driving situation with the situation detected by the automatically guided vehicle.

In particular, the disclosed device is configured for displaying the guide vehicle and the vehicle behind one another in animated form on the display. In this context, the device displays the vehicle as a symbol which describes the current state.

In other words, the guide vehicle is displayed in front of the vehicle, both the guide vehicle and the vehicle being imaged in animated form. Depending on whether the disclosed device can display two, three or four of the states described before, correspondingly many symbols exist for displaying the current state distinguishably from the other states by means of the symbol. The representation of one's own vehicle as the symbol describing the current state is a very compact representation which enables the driver to rapidly detect the current driving situation.

According to at least one disclosed embodiment, the device is configured for identifying an area directly adjoining the guide vehicle and lying in the direction of the vehicle as a so-called safety area on the display which marks a minimum distance of the vehicle, the automatic longitudinal control of which is active.

It should be pointed out again that in the case of a vehicle which is driven automatically, the automatic longitudinal guidance of the vehicle is also mandatorily activated.

The safety area marks an area into which the vehicle, the automatic longitudinal control of which is active, will never penetrate. This illustrates that the vehicle acting automatically with regard to its longitudinal control will not drop below a specified safety distance which is marked by the safety area.

Disclosed embodiments also provide a method for a vehicle which is configured for automatic longitudinal control. This method comprises the following operations:

Detecting (with one or with more sensors) a guide vehicle.

Determining a current state which describes a current response of the vehicle to the guide vehicle. In this context, one of a number of (at least two) states is determined.

Displaying the current state in a form distinguishable from the other states and in animated form on a display (for example, of the vehicle or of a mobile device).

The disclosed method provides essentially the same benefits as the disclosed device.

The states which are determined by the disclosed method and displayed distinguishably can be selected from the group of states described above.

Within the context of the disclosed embodiments, a vehicle can also be provided which comprises the disclosed device.

The disclosed embodiments are suitable for motor vehicles which are configured for automatic longitudinal control or for automatic driving. In addition, however, the disclosed embodiments can also be used for rail-connected or track-guided vehicles and for ships or aircraft.

A driver of a vehicle which is configured for automatic longitudinal control or even for automatic driving is supplied with information about his automatically driven vehicle in a very simple manner. It is possible that the driver, who is for example, busy with other secondary tasks, is informed about the current or even future events of his vehicle only by short looks at the display. By means of this offer of information, the driver can build up the necessary confidence and awareness of the situation to be able to utilize the automatic driving function of his vehicle in an appropriate manner.

The concept to detect and display a driving situation in that one of a limited number of states which describe this driving situation is displayed in animated form on a display can also be used generally in any means of transportation or in all situations in which passengers are transported. In this context, the display can both be mounted permanently in the respective means of transportation and represent the display of a mobile device (e.g., smart phones, tablet PCs, wristwatch). When the disclosed embodiments are used in any means of transportation, the respective user of the respective means of transportation is informed about impending kinesthetic changes and can adjust to these correspondingly. Thus, when the disclosed embodiments are used in streetcar or subway traffic, it is conceivable to inform the passengers in time about an impending braking process via the representation on the display. In the same manner, the representation of the driving situation can be imaged on the display of a mobile device, the current content of the display being overwritten to inform the user in time about an impending driving maneuver of the means of transportation used even during the use of his mobile device. In aviation operation, the disclosed embodiments can be used, for example, to display information about impending wall maneuvers so that, on the one hand, objects not attached can be secured in time and, on the other hand, the seat can be taken again in time. In addition, the disclosed embodiments can assist persons with fear of flying to provide a better understanding of the entire sequence of a flight to thus build up more confidence in the technical and human elements involved. States shown about impending ascending and descending maneuvers can also assist in performing timely pressure equalization (e.g., by breathing techniques or chewing movements).

In sea travel, the disclosed embodiments can be used in the same manner as described above for air travel. This applies especially to smaller ships which have greater dynamics. Since the behavior of sea vehicles still depends to a significantly greater extent on environmental conditions (particularly on wind conditions), the group of states can be extended to the extent of states which describe impending responses (for example, a great inclination of the ship caused by a gust or heavy swell) are included and can thus be displayed on the display. These additional states can be determined, for example, by means of sensors which detect wind conditions or evaluate information of human observers.

On the display 8 shown in FIG. 1, a guide vehicle 5 is shown in front of a symbol 1, symbol 1 representing the location of one's own vehicle and describing the current state with respect to a response of the vehicle to the guide vehicle 5. In addition, an area 6, which directly adjoins the guide vehicle 5 directly behind the guide vehicle 5, particularly characterized (in this case as shaded area) to illustrate that a specified safety distance is not violated. Finally, the current distance 7 between one's own vehicle and the guide vehicle 5 is displayed.

The guide vehicle 5 and the area 6 marking the safety distance and/or the symbol 1-4 describing the current state and/or the current distance 7 can always be depicted at the same location of the display 8. As a result, the observer becomes used to the type of representation and can thus quickly detect the current state.

Figure 2:
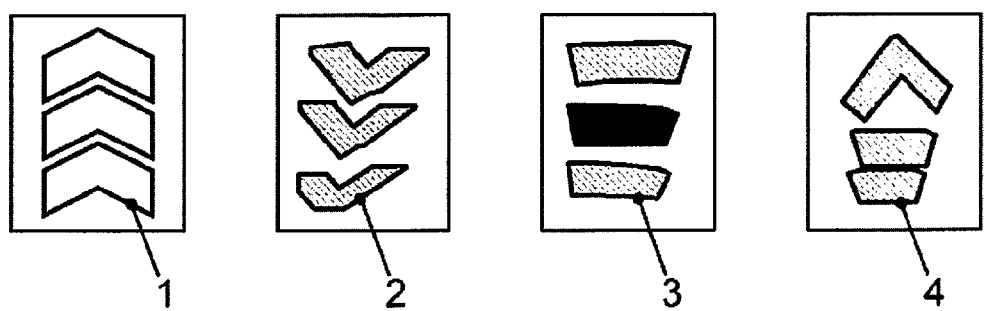
FIG. 2 shows four symbols for displaying the current state.

The current system action, i.e., the current action or the current state of the system which is configured for automatic driving or for automatic longitudinal guidance of the vehicle, and thus the current response of the vehicle to the guide vehicle, can be described by the symbols 1-4 shown in FIG. 2.

In this context, the first symbol 1 describes the system action or the state that the vehicle follows the guide vehicle with a constant or an increasing speed. The first symbol 1 accordingly describes the system action or the state of "following". The second symbol 2 describes the system action or the state that the vehicle follows the guide vehicle with decreasing speed, i.e., the vehicle is braked. The third symbol 3 describes the system action or the state that the vehicle is standing and will follow the guide vehicle currently standing as soon as the guide vehicle starts to move. Finally, the fourth symbol 4 describes the system action or the state that the vehicle is standing and will soon start to drive to follow the guide vehicle which is just starting to move. When the guide vehicle 5 drives off, the system needs a few seconds before the vehicle follows the guide vehicle so that the vehicle is still standing in this state although the guide vehicle 5 is already moving.

Whilst the vehicle is driving in the first or second state, indicated by the first symbol 1 or the second symbol 2, the vehicle is standing in the third or fourth state which is indicated by the third symbol 3 or fourth symbol 4. Whilst the third state or the third symbol 30 symbolizes that the system for automatic longitudinal control of the vehicle or for automatic driving of the vehicle is active, the fourth state or the fourth symbol 4 symbolizes that the system is not only active but that the vehicle will now follow the guide vehicle which has just started to move.

Figure 3:
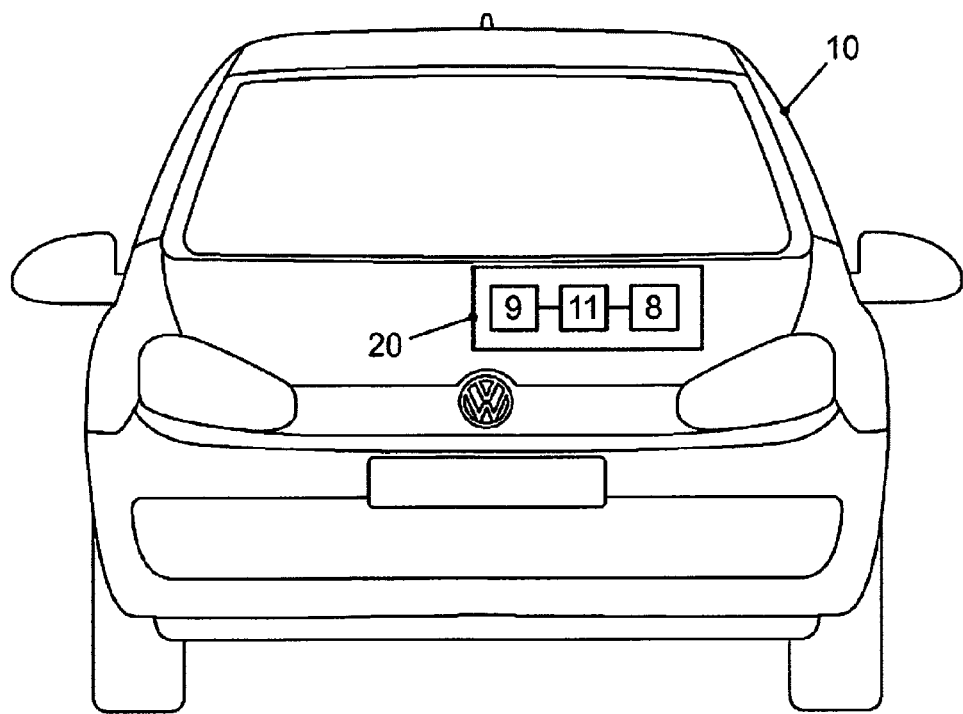
FIG. 3 shows a vehicle with a disclosed device.

In FIG. 3, a vehicle 10 is shown which comprises a device 20. The vehicle 10 is configured for automatic longitudinal control or for automatic driving. The device 20 comprises, apart from a control 11, a sensor 9 and a display 8. By means of the sensor 9, objects can be detected in the environment of the vehicle 10 and, in particular, the guide vehicle 5. The device 20 is able to determine, based on the output of the sensor, a current state which describes a current response of the vehicle 10 to the guide vehicle 5 and to display this state in animated form on the display 8.

Vehicles which are configured for automatic longitudinal control or for automatic driving are already on the market or are at least in planning. In particular, in phases in which such a function automatically controlling a vehicle is introduced newly on the market or when a driver comes into contact with such a function for the first time, it is particularly important to provide the driver with an appropriate understanding and confidence in this function.

DE 10 2007 029 482 A1 discloses a driver assistance system for controlling the speed of his own vehicle which, on detection of a starting situation, outputs an optical, acoustical and/or haptic starting notice.

LIST OF REFERENCE DESIGNATIONS

1 "Following" symbol
2 "Braking" symbol
3 "Readiness" symbol
4 "Starting off" symbol
5 Guide vehicle
6 Safety area
7 Distance
8 Display
9 Sensor
10 Vehicle
11 Control
20 Device

The invention claimed is:

1. A device for a vehicle configured for automatic longitudinal control, the device comprising:
a sensor;
a control; and
a display,
wherein the sensor is configured to detect a guide vehicle, the guide vehicle is a vehicle driving directly in front of the vehicle, and the device is configured for determining, in dependence on outputs of the sensor, a current following state of at least two following states which indicates a current response of the vehicle to the guide vehicle and a relationship between the guide vehicle and the vehicle and for displaying the current following state distinguishably from other following states in animated form on the display,
wherein the device displays the guide vehicle and the vehicle behind one another animated on the display and the vehicle is displayed in the form of a symbol which indicates the current following state of the vehicle, and
wherein the device identifies an area directly adjoining the guide vehicle and lying in front of the symbol that represents the vehicle on the display as a safety area which marks a minimum distance from the guide vehicle to the vehicle driving automatically.

2. The device of claim 1, wherein the at least two following states are selected from a group of following states comprising:
the vehicle follows the guide vehicle with a constant or increasing speed;
the vehicle follows the guide vehicle with a decreasing speed;
the vehicle will follow the guide vehicle currently stationary as soon as the guide vehicle drives off; and
the vehicle will follow the guide vehicle as it begins to move from a stationary position.

3. The device of claim 1, wherein the sensor determines a distance between the guide vehicle and the vehicle and the device displays the distance on the display.

4. A method for a vehicle configured for automatic longitudinal control, the method comprising:
detecting a guide vehicle with sensors of the vehicle, the guide vehicle being a vehicle driving directly in front of the vehicle;
determining, with a control located in the vehicle, a current following state of at least two following states which indicates a current response of the vehicle to the guide vehicle and a relationship between the guide vehicle and the vehicle; and
displaying the current following state distinguishably from other following states in animated form on a display,
wherein the device displays the guide vehicle and the vehicle behind one another animated on the display and the vehicle is displayed in the form of a symbol which indicates the current following state of the vehicle, and
wherein the device identifies an area directly adjoining the guide vehicle and lying in front of the symbol that represents the vehicle on the display as a safety area which marks a minimum distance from the guide vehicle to the vehicle driving automatically.

5. The method of claim 4, further comprising determining, with the sensors, a distance between the guide vehicle and the vehicle and displaying the determined distance on the display.

6. A device for a vehicle configured for automatic longitudinal control, the device comprising:
a sensor;
a control; and
a display,
wherein the sensor is configured to detect a guide vehicle, the guide vehicle is a vehicle driving directly in front of the vehicle, and the device is configured for determining, in dependence on outputs of the sensor, a current following state of at least two following states which indicates a current response of the vehicle to the guide vehicle and a relationship between the guide vehicle and the vehicle and for displaying the current following state distinguishably from other following states in animated form on the display,
wherein the device displays the guide vehicle and the vehicle behind one another animated on the display and the vehicle is displayed in the form of a symbol which indicates the current following state of the vehicle,
wherein the sensor determines a distance between the guide vehicle and the vehicle and the device displays the distance on the display,
wherein the symbol, the guide vehicle, the distance and a safety area are each displayed in the same location of the display.

7. A method for a vehicle configured for automatic longitudinal control, the method comprising:
- detecting a guide vehicle with sensors of the vehicle, the guide vehicle being a vehicle driving directly in front of the vehicle;
- determining, with a control located in the vehicle, a current following state of at least two following states which indicates a current response of the vehicle to the guide vehicle and a relationship between the guide vehicle and the vehicle;
- displaying the current following state distinguishably from other following states in animated form on a display, wherein displaying the current following state comprises displaying the vehicle in the form of a symbol which indicates the current following state;
- displaying the guide vehicle and the symbol behind one another animated on the display;
- determining, with the sensors, a distance between the guide vehicle and the vehicle and displaying the determined distance on the display,
- wherein the symbol, the guide vehicle, the distance and a safety area are each displayed in the same location of the display.

* * * * *